Feb. 12, 1952     O. A. STEFFENS     2,585,414
CONVEYER
Filed Sept. 30, 1950     2 SHEETS—SHEET 1
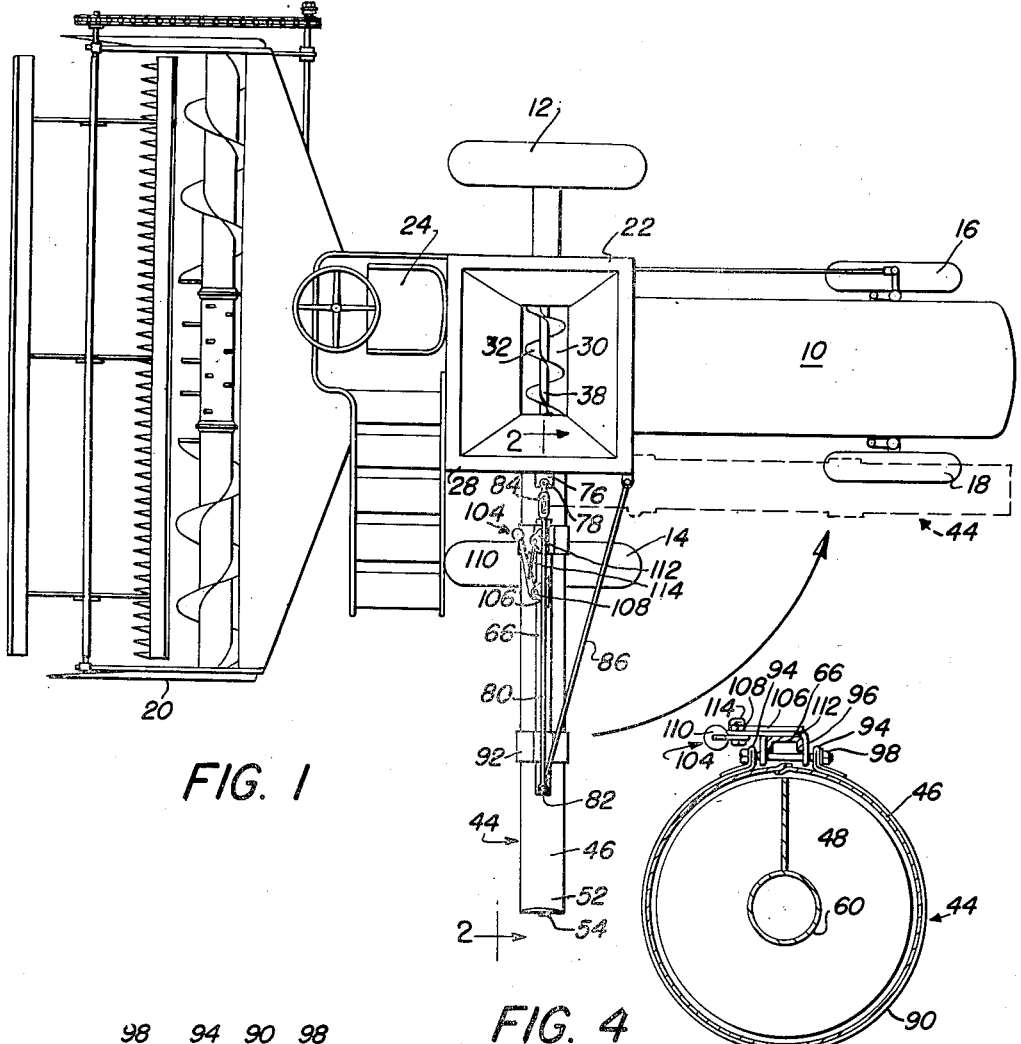
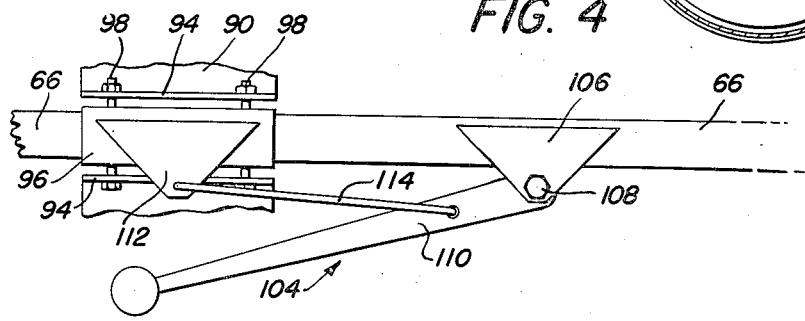
INVENTOR.
OTTO A. STEFFENS
ATTORNEYS Feb. 12, 1952     O. A. STEFFENS     2,585,414
CONVEYER
Filed Sept. 30, 1950     2 SHEETS—SHEET 2
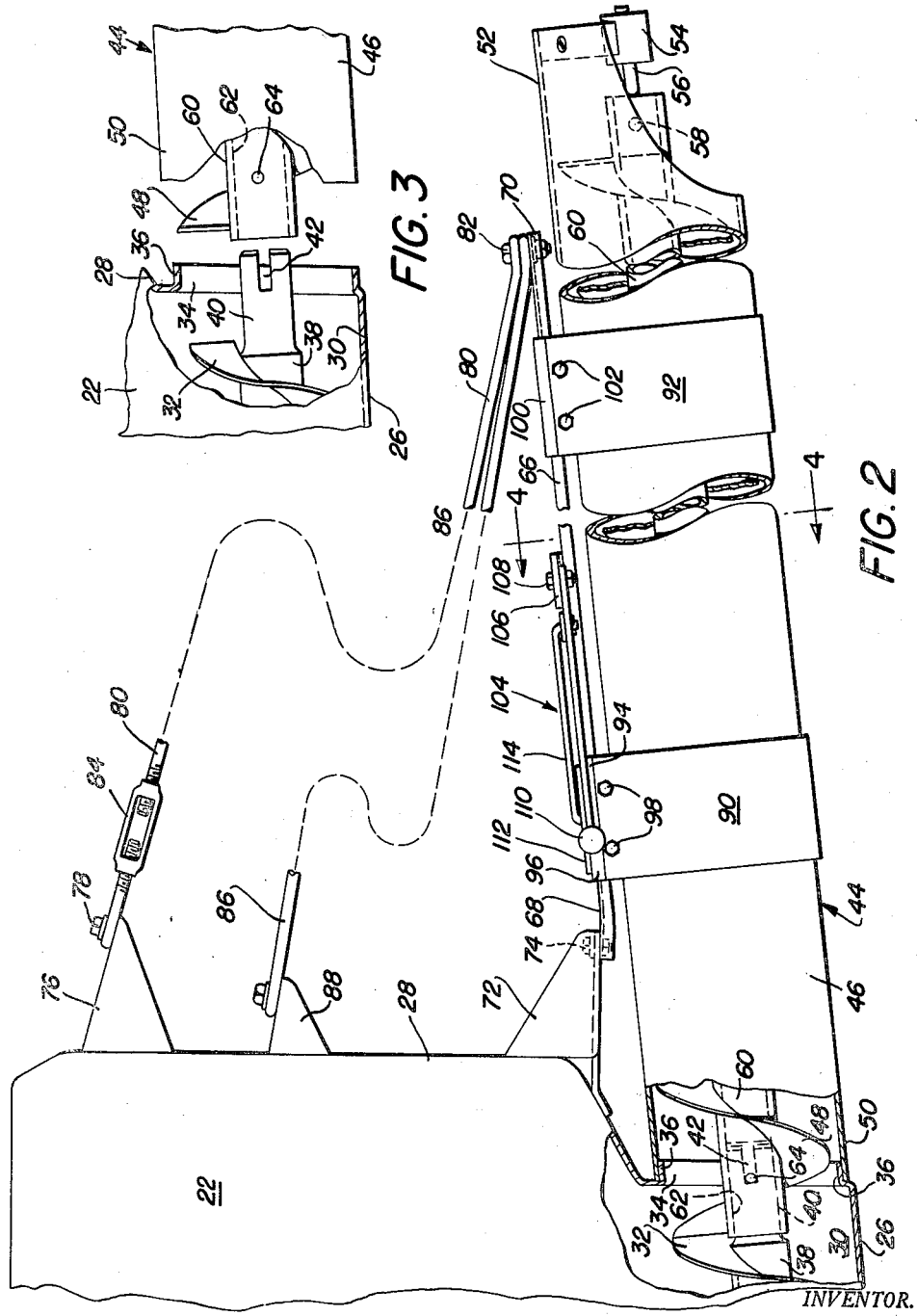
INVENTOR.
OTTO A. STEFFENS
ATTORNEYS Patented Feb. 12, 1952

2,585,414

UNITED STATES PATENT OFFICE 2,585,414

CONVEYER

Otto A. Steffens, East Moline, Ill., assignor to Deere & Company, Moline, Ill., a corporation of Illinois Application September 30, 1950, Serial No. 187,782

12 Claims. (Cl. 198—64)

This invention relates to a material-handling machine and more particularly to conveying means for removing or discharging material from a material-storage receptacle, which conveying means is selectively movable between normal or operating position and a folded or idle position.

The preferred embodiment of the invention disclosed herein finds its greatest practical utility in conjuction with the grain-receiving tank of a combine or similar machine. A combine, particularly one of the self-propelled type, is a relatively large machine having a harvester platform of considerable width. In some combines, the thresher body is located centrally of and immediately behind the platform, and in others the thresher body is offset relative to the platform. In either case, the combine will be provided with a relatively large tank to which threshed grain is delivered. The size of the tank is calculated to store threshed grain in a sufficient quantity to enable somewhat prolonged operation of the combine without unloading the tank except at rather infrequent intervals. For this purpose, a wagon or truck is drawn alongside the combine and grain is discharged from the tank via a conveyor, normally of the enclosed-auger or helicoid type. The wagon or truck may then be driven away for unloading and operation of the combine will be continued until the tank is again full enough to require unloading. In the case of the typical combine, the auger conveyor extends laterally at one side of the thresher body and grain tank to an extent sufficient to provide for adequate clearance between the combine and the wagon or truck into which the unloading auger discharges. This extent of the unloading auger materially increases the over-all width of the machine. In many combines heretofore known, transport of the combine along narrow roads and through narrow gates could be effected only by completely removing the unloading auger. In other combines, provision was made for folding of the auger to a position in which it would lie alongside the grain tank and/or thresher body. In many constructions of the latter type, the provision for folding of the unloading auger is of such complicated nature as to make it substantially as easy to remove the auger as to fold it.

According to the present invention, the unloading auger is provided with an improved and novel supporting structure by means of which folding and repositioning of the auger are made relatively easy. Specifically, the grain tank or other structural part of the combine or comparable material-handling machine is provided with a support that extends normally outwardly from a material-discharge opening in the grain tank or other receptacle. The mounting for this support includes a pivot so that the support may be swung from the normal outwardly extending position to another position in which it lies alongside the grain tank or receptacle. In those cases in which the grain tank is provided with a self-contained primary auger at its bottom to move material outwardly through the discharge opening, the extension auger or unloading auger is in the form of a conveyor having an elongated cylindrical housing in which is enclosed an unloading auger or helicoid. The conveyor housing is slidably carried on the support and it has an inner end separably associated with the discharge opening so as to provide a material-transfer coupling. The inner end of the unloading helicoid is separably associated with the outer end of the receptacle auger by means of a connectible and disconnectible driving connection. Control means are provided for shifting the conveyor casing and helicoid outwardly on the support so that separation is effected between the housing and receptacle and between the two augers, whereupon the support, together with the housing and helicoid, may be swung about the pivotal connection between the support and the receptacle. Provision is made for facilitating reconnection of the housing with the receptacle and reconnection of the two augers in driving relationship. It is a further feature of the invention to provide the unloading helicoid as substantially a coaxial extension of the self-contained auger of the receptacle.

The foregoing and other important objects and desirable features inherent in and encompassed by the invention will become apparent from the following detailed description and accompanying sheets of drawings in which Figure 1 is a plan view of a typical combine, showing in full lines the normal or unloading position of the auger and in dotted lines the idle or folded position of the auger;

Figure 2 is a view, on an enlarged scale, taken substantially on the line 2—2 of Figure 1;

Figure 3 is a fragmentary view showing the manner in which the extension or unloading conveyor and its helicoid are axially separated from the receptacle and its helicoid or auger;

Figure 4 is a transverse sectional view taken substantially on the line 4—4 of Figure 2; and Figure 5 is a fragmentary plan view, drawn to an enlarged scale, showing the control means for effecting shifting of the unloading auger housing relative to its support.

The combine illustrated in Figure 1, as representative of one form of material-handling machine with which the present invention may be utilized, comprises an elongated thresher body 10 carried at its front end on traction wheels 12 and 14 and at its rear end on steerable wheels 16 and 18. A harvester platform 20 is positioned ahead of the thresher body for harvesting grain and delivering it to threshing mechanism (not shown) contained within the thresher body. This grain is ultimately delivered, by means not shown, to a receptacle such as a grain tank 22. The combine is illustrated as having an operator's platform 24 ahead of the grain tank 22.

The grain tank shown has a bottom 26 and a plurality of upright side walls, only one of which, designated by the numeral 28, is important to the present disclosure. Inwardly inclined lower walls or floor portions combine with the bottom 26 to provide the tank with a primary auger trough 30, which extends transversely as respects the thresher body 10 and which carries movable means, such as an auger or helicoid 32, for moving or discharging material outwardly through a material-discharge opening 34 formed in the side wall 28 coaxial with the auger trough 30. This opening is surrounded or bordered by an outwardly extending marginal portion in the form of an annular, outwardly extending flange 36.

The auger or helicoid 32 is formed with a central shaft 38 having an outer end portion 40 exposed to the outside of the receptacle through the discharge opening 34. This portion 40 constitutes driving means and is formed at its end with an inwardly extending diametrical slot 42, the function of which will be presently described.

The preferred form of unloading or extension conveyor is designated generally by the numeral 44 and comprises a cylindrical tubular conveyor housing 46 of elongated construction and enclosing a rotatable, elongated material-moving means in the form of an extension auger or helicoid 48. The housing 46 has an inner material-receiving end 50 and an outer material-discharge end 52. The latter end carries bearing means 54 for journaling a stud shaft 56 which is fixed at 58 to the outer end of a tubular core or shaft 60 about which the helicoid or auger 48 is wound. The bearing means 54 fixes the helicoid 48 against longitudinal or axial shifting relative to the housing 46.

The inner end of the shaft or core 60 is recessed or hollow at 62 and is provided with a diametrical pin 64. When the conveyor 44 is in its normal or unloading position as shown in Figure 2, the inner end of the housing 46 interfits with the annular flange 36 about the discharge opening 34 of the receptacle, and the recessed end 62 of the shaft 60 receives the reduced driving end 40 of the receptacle auger 32, the transverse or diametrical pin 64 being received in the open-ended slot 42 in the auger shaft portion 40. The relationship between the two augers is that one is a substantially coaxial extension of the other and the driving connection therebetween is effected by means providing an axially separable connection.

The relation between the inner end of the conveyor housing 46 and the annular flange 36 about the receptacle opening 34 is such as to provide an axially separable material-transfer coupling. Hence, in its normal or operating position, the conveyor 44 serves as means by which material stored in the tank 22 may be moved outwardly from the tank and discharged at the discharge end 52 of the conveyor. As shown in Figure 1, the extent of the conveyor 44 is such that a wagon or truck may be driven alongside of the combine so that the contents of the tank 22 may be unloaded.

It is an important feature of the invention to provide a support for carrying the conveyor 44 in either its normal or folded position. This support comprises primarily an elongated member 66, preferably of channel cross section (Figure 4) and having an inner end 68 and an outer end 70. The normal disposition of the member 66 is as shown in Figure 2 and in full lines in Figure 1. The member extends substantially parallel to the conveyor 44 and has its inner end 68 in close proximity to the upright wall 28 of the receptacle or tank 22. The inner end 68 of the member 66 has thereon means for mounting the support on the receptacle so that the support normally extends outwardly from the tank. This means includes a bracket 72, which may be rigidly attached to the upright wall 28 in any suitable manner. This means further includes a substantially upright pivot, here provided by a pivot bolt 74, positioned outwardly of and in a vertical plane through the axis of the auger 32—48. A second bracket 76 may be rigidly secured in any suitable manner to an upper portion of the upright wall 28. This bracket may include a vertical pivot, such as a pivot bolt 78, substantially in vertical alinement with and above the pivot bolt 74. An outwardly and downwardly inclined brace 80 is connected at the point 78 and has its outer end connected at 82 to the outer end 70 of the member 66. The brace 80 may comprise two parts interconnected by a turnbuckle 84 for adjusting the brace to secure the proper angle of the conveyor 44. The support may further include a second brace 86 connected at the point 82 at one end and extending at an angle, as indicated in Figure 1, for connection to a bracket 88 on the tank 22 to hold the supported conveyor against rearward swinging. The connection at 88 is preferably easily removable so that rearward swinging may be accomplished, as will be explained below.

The conveyor 44 is sustained by the support or member 66 by means of a pair of spaced-apart carriers 90 and 92. The spacing of these carriers is axially as respects the conveyor housing 46 or lengthwise as respects the support 66. The carrier 90, as best shown in Figures 2 and 4, is a substantially circular member provided with closely spaced-apart terminal ends 94 lying respectively at opposite sides of an inverted U-shaped slide 96 slidably embracing or carried by the member 66. Connection of the carrier 90 to the slide 96 may be effected, as shown, by a pair of bolts 98. The other carrier 92 is similarly constructed and is associated with a slide 100, being connected thereto by means such as a pair of bolts 102. The construction is such that the axial spacing of the carriers is fixed and so that the conveyor 44 may be shifted lengthwise selectively inwardly or outwardly on the support or member 66.

Another feature of the invention resides in control means, designated generally by the numeral 104, for effecting selective shifting of the conveyor on the support. As best shown in Figure 5, the support or member 66 carries at a point intermediate the carriers 90 and 92 a fixed bracket 106 to which is pivoted at 108 a manually operative link or member 110. The carrier 90 has associated therewith a bracket 112, which is fixed to the associated slide 96. A second connecting link or member 114 is pivotally connected at one end to the bracket 112 and at its other end to the operating member 110. The normal position of the linkage or control means 104 is as shown in Figures 1 and 5. The arrangement is such that the conveyor 44 cannot be easily shifted inadvertently relative to the support 66 while in operating position.

Operation and use

During normal operation of the combine, the unloading auger or conveyor 44 will extend laterally outwardly as shown in full lines in Figure 1 and also as shown in Figure 2. In this position, the discharge end 52 of the conveyor 44 is disposed laterally outwardly in such position that a wagon or truck has sufficient room alongside the combine for maneuvering to receive grain from the tank. The tank auger 38 normally receives power from suitable means (not shown) on the machine. The drive connection 42—64 thus serves as means whereby the auger 38 drives the unloading auger 48. The brace 86 holds the conveyor 44 against rearward or forward swinging about the pivot 74—78.

When it is desired to transport the combine, the conveyor may be folded to its dotted-line position merely by removal of the connection at 88. The operating member 110 is swung about its pivot 108 in an outward direction (counterclockwise as viewed in Figures 1 and 5). Movement of the link or member 110 in this direction functions through the connecting link 114 to shift the conveyor 44 outwardly on the support 66. As shown in Figure 3, the amount of outward or axial movement is sufficient to clear the inner end 50 of the conveyor housing from the annular flange 36 about the opening 34. This movement is also sufficient to completely axially separate the inner end portion 62 of the unloading auger shaft 60 from the outer end 40 of the tank auger shaft 38. The support, together with the conveyor 44, may then be swung about the pivot 74—78. The brace may be easily folded to a position over the conveyor 44, after it has been disconnected.

Summary

It will be seen from the foregoing that the improved unloading auger is of simplified construction and easily operated. The mechanical advantage afforded by the control means 104 facilitates easy shifting of the conveyor on the support 66 so that disconnections at 42—64 and 36—50 may be easily effected. Reconnection of the parts is just as easily accomplished, since the recessed portion 62 of the unloading auger shaft 60 readily receives the reduced end 40 of the tank auger shaft 38.

Other features of the invention not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. In a material-handling machine having a storage receptacle including a bottom and an upright wall formed with a circular opening positioned adjacent the bottom and bordered by an outwardly extending annular flange, and auger means within the receptacle at the bottom thereof and coaxial with the opening and having an outer end exposed through the opening, the improvement comprising: an elongated cylindrical conveyor housing normally positionable as a substantially coaxial, outward extension from the discharge opening and having an inner receiving end and an outer discharge end; means at the inner end of the housing providing an axially separable material-transfer coupling with the annular flange of the receptacle opening; an auger conveyor rotatable in the housing and having an inner end exposed at the inner end of the housing; bearing means in the housing fixing the housing auger against axial shifting relative to the housing; means on the inner end of the housing auger providing an axially separable drive connection with the outer end of the receptacle auger; a support having means for pivotal mounting on the receptacle to extend selectively normally outwardly from the receptacle in the direction of the housing or to lie folded about said pivot means alongside the receptacle wall; means slidably sustaining the housing on the support for movement of the housing axially outwardly sufficiently to separate the material transfer coupling so that the inner end of the housing is axially clear of the annular flange about the receptacle opening and further to axially separate the drive connection between the augers, whereby the housing and housing auger may be swung with the support to its folded position; and control means for selectively moving the housing inwardly or outwardly on the support.

2. The invention defined in claim 1, further characterized in that: the support includes an elongated member paralleling the housing; the means for sustaining the housing on the support includes a pair of axially spaced apart carriers fixed to the housing and slidably carried on said member; and the control means includes a pair of relatively movable elements operatively interconnected and connected respectively to said member and to one of the carriers.

3. The invention defined in claim 1, further characterized in that: the support includes an elongated member paralleling the housing; the means for sustaining the housing on the support includes a pair of axially spaced apart carriers fixed to the housing and slidably carried on said member; the pivot means for mounting the support on the receptacle is on a substantially vertical axis and is positioned closely adjacent the receptacle opening; and said support includes a brace having one end pivotally connected to the receptacle substantially vertically coaxial with said pivot means, and an outer end connected to the member outwardly of the carriers.

4. In a material-handling machine having a storage receptacle including an upright wall formed with a circular opening bordered by an outwardly extending annular flange, the improvement comprising: an elongated cylindrical conveyor housing normally positionable as a substantially coaxial, outward extension from the discharge opening and having an inner receiving end and an outer discharge end; means at the inner end of the housing providing an axially separable material-transfer coupling with the annular flange of the receptacle opening; a support having means for pivotal mounting on the receptacle to extend selectively normally outwardly from the receptacle in the direction of the housing or to lie folded about said pivot means alongside the receptacle wall; means slidably sustaining the housing on the support for movement of the housing axially outwardly sufficiently to separate the material transfer coupling so that the inner end of the housing is axially clear of the annular flange about the receptacle opening, whereby the housing may be swung with the support to its folded position; and control means for selectively moving the housing inwardly or outwardly on the support.

5. The invention defined in claim 4, further characterized in that: the support includes an elongated member paralleling the housing; the means for sustaining the housing on the support includes a pair of axially spaced apart carriers fixed to the housing and slidably carried on said member; and the control means includes a pair of relatively movable elements operatively interconnected and connected respectively to said member and to one of the carriers.

6. The invention defined in claim 4, further characterized in that: the support includes an elongated member paralleling the housing; the means for sustaining the housing on the support includes a pair of axially spaced apart carriers fixed to the housing and slidably carried on said member; the pivot means for mounting the support on the receptacle is on a substantially vertical axis and is positioned closely adjacent the receptacle opening; and said support includes a brace having one end pivotally connected to the receptacle substantially vertically coaxial with said pivot means, and an outer end connected to the member outwardly of the carriers.

7. In a material-handling machine having a storage receptacle including a bottom and an upright wall formed with a circular opening positioned adjacent the bottom and bordered by an outwardly extending annular flange, and auger means within the receptacle at the bottom thereof and coaxial with the opening and having an outer end exposed through the opening, the improvement comprising: an elongated cylindrical conveyor housing normally positionable as a substantially coaxial, outward extension from the discharge opening and having an inner receiving end and an outer discharge end; means at the inner end of the housing providing an axially separable material-transfer coupling with the annular flange of the receptacle opening; an auger conveyor rotatable in the housing and having an inner end exposed at the inner end of the housing; bearing means in the housing fixing the housing auger against axial shifting relative to the housing; means on the inner end of the housing auger providing a drive connection with the outer end of the receptacle auger, including relatively axially movable drive elements; a support having means for pivotal mounting on the receptacle to extend selectively normally outwardly from the receptacle in the direction of the housing or to lie folded about said pivot means alongside the receptacle wall; means slidably sustaining the housing on the support for movement of the housing axially outwardly sufficiently to separate the material transfer coupling so that the inner end of the housing is axially clear of the annular flange about the receptacle opening, the aforesaid relatively axially movable drive elements in the drive connection accommodating relative axial movement between the augers, whereby the housing and housing auger may be swung with the support to its folded position; and control means for selectively moving the housing inwardly or outwardly on the support.

8. In a material-handling machine having a storage receptacle including an upright wall formed with an opening including an outwardly extending marginal portion, the improvement comprising: an elongated conveyor housing normally positionable as an outward extension from the discharge opening and having an inner receiving end and an outer discharge end; means at the inner end of the housing providing an outwardly separable material-transfer coupling with the marginal portion of the receptacle opening; a support having means for pivotal mounting on the receptacle to extend selectively normally outwardly from the receptacle in the direction of the housing or to lie folded about said pivot means alongside the receptacle wall; means slidably sustaining the housing on the support for movement of the housing outwardly sufficiently to separate the material transfer coupling so that the inner end of the housing is outwardly clear of the marginal portion of the receptacle opening, whereby the housing may be swung with the support to its folded position; and control means for selectively moving the housing inwardly or outwardly on the support.

9. In a material-handling machine having a receptacle including an upright side wall formed with a material-discharge opening, and movable means in the receptacle for moving material outwardly through said opening, the improvement comprising: a support positionable to extend normally outwardly from the receptacle side wall and having an inner end portion provided with means for the mounting of the support on the receptacle side wall on a substantially upright pivot in substantially vertical alinement with the discharge opening for selective swinging of the support between said normally outwardly extending position and a position in which said support lies alongside the receptacle side wall; a conveyor housing generally paralleling the support and having an inner receiving end and an outer discharge end; means slidably sustaining the conveyor housing on the support for swinging of the housing with the support and movement of the housing selectively inwardly or outwardly relative to the support; means at the inner end of the housing effective, when the support and housing are normally positioned, to provide a material-transfer coupling with the discharge opening, said coupling being respectively connectible or disconnectible incident to inward or outward movement of the housing on the support; drivable conveying means carried by the housing and having an inner end portion including drive means respectively connectible with or disconnectible from the movable means in the receptacle incident to inward or outward movement of the housing on the support; and control means connected between the housing and the support for selectively moving the housing outwardly or inwardly on the support.

10. In a material-handling machine having a receptacle including an upright side wall formed with a material-discharge opening, and driving means carried by the receptacle adjacent said opening, the improvement comprising: a support positionable to extend normally outwardly from the receptacle side wall and having an inner end portion provided with means for the mounting of the support on the receptacle side wall on a substantially upright pivot in substantially vertical alinement with the discharge opening for selective swinging of the support between said normally outwardly extending position and a position in which said support lies alongside the receptacle side wall; a conveyor housing generally paralleling the support and having an inner receiving end and an outer discharge end; means slidably sustaining the conveyor housing on the support for swinging of the housing with the support and movement of the housing selectively inwardly or outwardly relative to the support; means at the inner end of the housing effective, when the support and housing are normally positioned, to provide a material-transfer coupling with the discharge opening, said coupling being respectively connectible or disconnectible incident to inward or outward movement of the housing on the support; drivable conveying means carried by the housing and having an inner end portion including drive means respectively connectible with or disconnectible from the driving means of the receptacle incident to inward or outward movement of the housing on the support; and control means connected between the housing and the support for selectively moving the housing outwardly or inwardly on the support.

11. In a material-handling machine having a storage receptacle including an upright wall formed with an opening including an outwardly extending marginal portion, the improvement comprising: an elongated conveyor housing normally positionable as an outward extension from the discharge opening and having an inner receiving end and an outer discharge end; means at the inner end of the housing providing an outwardly separable material-transfer coupling with the marginal portion of the receptacle opening; a support having means for pivotal mounting on the receptacle to extend selectively normally outwardly from the receptacle in the direction of the housing or to lie folded about said pivot means alongside the receptacle wall; and means slidably sustaining the housing on the support for movement of the housing outwardly sufficiently to separate the material transfer coupling so that the inner end of the housing is outwardly clear of the marginal portion of the receptacle opening, whereby the housing may be swung with the support to its folded position.

12. In a material-handling machine having a receptacle including an upright side wall formed with a material-discharge opening, and driving means carried by the receptacle adjacent said opening, the improvement comprising: a support positionable to extend normally outwardly from the receptacle side wall and having an inner end portion provided with means for the mounting of the support on the receptacle side wall on a substantially upright pivot in substantially vertical alinement with the discharge opening for selective swinging of the support between said normally outwardly extending position and a position in which said support lies alongside the receptacle side wall; a conveyor housing generally paralleling the support and having an inner receiving end and an outer discharge end; means slidably sustaining the conveyor housing on the support for swinging of the housing with the support and movement of the housing selectively inwardly or outwardly relative to the support; means at the inner end of the housing effective, when the support and housing are normally positioned, to provide a material-transfer coupling with the discharge opening, said coupling being respectively connectible or disconnectible incident to inward or outward movement of the housing on the support; and drivable conveying means carried by the housing and having an inner end portion including drive means respectively connectible with or disconnectible from the driving means of the receptacle incident to inward or outward movement of the housing on the support.

OTTO A. STEFFENS.

No references cited.